US011919112B2

(12) United States Patent
Shindo et al.

(10) Patent No.: US 11,919,112 B2
(45) Date of Patent: Mar. 5, 2024

(54) MACHINE TOOL

(71) Applicant: NAGASE INTEGREX CO., LTD., Seki (JP)

(72) Inventors: Ryota Shindo, Seki (JP); Keiji Uemura, Seki (JP)

(73) Assignee: NAGASE INTEGREX CO., LTD, Gifu-ken (JP)

( * ) Notice: Subject to any disclaimer, the term of this patent is extended or adjusted under 35 U.S.C. 154(b) by 0 days.

(21) Appl. No.: 18/118,332

(22) Filed: Mar. 7, 2023

(65) Prior Publication Data

US 2023/0201981 A1 Jun. 29, 2023

Related U.S. Application Data

(63) Continuation of application No. 16/424,798, filed on May 29, 2019, now Pat. No. 11,654,519.

(30) Foreign Application Priority Data

May 31, 2018 (JP) .................................. 2018-105205
Sep. 26, 2018 (JP) .................................. 2018-180738

(51) Int. Cl.
*B23Q 11/00* (2006.01)
*B23Q 1/01* (2006.01)
(Continued)

(52) U.S. Cl.
CPC ............ *B23Q 11/001* (2013.01); *B23Q 1/015* (2013.01); *B23Q 1/621* (2013.01); *B24B 41/02* (2013.01); *Y10T 409/309744* (2015.01)

(58) Field of Classification Search
CPC ... B24B 41/007; B24B 41/02; B23Q 11/0007; B23Q 11/0017; B23Q 1/015;
(Continued)

(56) References Cited

U.S. PATENT DOCUMENTS 3,390,862 A * 7/1968 Schrepfer ................ F16M 7/00
254/104
4,621,407 A 11/1986 Suzuki
(Continued)

FOREIGN PATENT DOCUMENTS

CN 203228066 10/2013
CN 104827301 A * 8/2015 ........... B23Q 1/0054
(Continued)

OTHER PUBLICATIONS

J.C. Aurich, D. Biermann, H. Blum, C. Brecher, C. Carstensen, B. Denkena, F. Klocke, M. Kroger, P. Steinmann, K. Weinert; "Modelling and simulation of process; machine interaction in grinding"; Product Engineering Research—Development; Nov. 15, 2008; pp. 111-120; vol. 3; Springer; Heidelberg, Germany.
(Continued)

*Primary Examiner* — Sunil K Singh
*Assistant Examiner* — Michael Vitale
(74) *Attorney, Agent, or Firm* — Grogan, Tuccillo & Vanderleeden LLP

(57) ABSTRACT

A machine tool includes a bed including a bottom surface and legs arranged at three positions of the bottom surface. The bed includes two oblique sides arranged such that the bottom surface has a triangular shape. The machine tool also includes a first support surface arranged on the bed and extending along a substantially horizontal first axis, a work table supported by the first support surface so as to move along the first axis, a second support surface arranged on the bed and extending along a substantially horizontal second axis, which is perpendicular to the first axis, and a machining unit supported by the second support surface so as to move along the second axis. The second support surface is located higher than the first support surface.

2 Claims, 9 Drawing Sheets

(51) Int. Cl.
  *B23Q 1/62* (2006.01)
  *B24B 41/02* (2006.01)
(58) Field of Classification Search
  CPC .............. B23Q 11/0003; B23Q 11/001; B23Q 11/0014; Y10T 409/309744; Y10T 409/309576
  USPC ................................. 409/235, 238; 451/340
  See application file for complete search history.

(56) References Cited

U.S. PATENT DOCUMENTS

| | | | | |
|---|---|---|---|---|
| 4,846,436 | A * | 7/1989 | Young | F16M 7/00 248/188.4 |
| 4,930,741 | A * | 6/1990 | Young | F16F 15/027 248/650 |
| 5,028,180 | A | 4/1991 | Sheldon et al. | |
| 5,678,291 | A | 10/1997 | Braun | |
| 6,048,143 | A | 4/2000 | Chang et al. | |
| 6,241,437 | B1 | 6/2001 | Wieland | |
| 2002/0176757 | A1 | 11/2002 | Saito et al. | |
| 2004/0255736 | A1 | 12/2004 | Nakamura et al. | |
| 2006/0153653 | A1 | 6/2006 | Lu et al. | |
| 2011/0044778 | A1 | 2/2011 | Yamada et al. | |
| 2011/0054821 | A1 * | 3/2011 | Merlot | G01B 21/045 702/95 |
| 2011/0056343 | A1 | 3/2011 | Yoshida | |
| 2012/0020755 | A1 | 1/2012 | Hiroshima et al. | |
| 2012/0035770 | A1 * | 2/2012 | Lustenberger | F16M 7/00 700/275 |
| 2013/0129439 | A1 | 5/2013 | Hiroshima et al. | |
| 2013/0207331 | A1 | 8/2013 | Jung et al. | |
| 2013/0322979 | A1 | 12/2013 | Koike et al. | |
| 2015/0367472 | A1 | 12/2015 | Suzuki et al. | |
| 2016/0176002 | A1 | 6/2016 | Grob | |
| 2016/0193704 | A1 | 7/2016 | Grob | |
| 2016/0199955 | A1 | 7/2016 | Grob | |

FOREIGN PATENT DOCUMENTS

| | | | |
|---|---|---|---|
| DE | 202014103569 | 10/2014 | |
| DE | 102013214151 B4 * | 3/2015 | ........... B23Q 1/0054 |
| DE | 102016101666 A1 * | 8/2017 | ........... B23Q 1/0054 |
| EP | 1488887 | 12/2004 | |
| EP | 3308903 | 4/2018 | |
| JP | 6017929 | 2/1985 | |
| JP | 0253538 | 2/1990 | |
| JP | 02243257 | 9/1990 | |
| JP | H10138132 | 5/1998 | |
| JP | H11320301 | 11/1999 | |
| JP | 2001062715 | 3/2001 | |
| JP | 2003340661 | 12/2003 | |
| JP | 2004358627 | 12/2004 | |
| JP | 2005131768 | 5/2005 | |
| JP | 2005319522 | 11/2005 | |
| JP | 2007296602 | 11/2007 | |
| JP | 2008229811 | 10/2008 | |
| JP | 2011056609 | 3/2011 | |
| RU | 2538884 C1 * | 1/2015 | |
| WO | 0000323 | 1/2000 | |
| WO | 2012111170 | 8/2012 | |
| WO | 2017021733 | 2/2017 | |
| WO | 2018061970 | 4/2018 | |

OTHER PUBLICATIONS

"Profitmat MT Profile grinding with increased profitability"; BLOHMJung GmbH; Hamburg, Germany.
United States Examiner's Amendment with cited reference dated Oct. 27, 2022 from corresponding U.S. Appl. No. 16/424,798.
Japanese Office Action dated Jul. 25, 2023 for corresponding Japanese Application No. JP2022093673.

* cited by examiner

MACHINE TOOL

CROSS REFERENCE TO RELATED APPLICATIONS

This application is a continuation application of U.S. patent application Ser. No. 16/424,798, filed on May 29, 2019, and titled "MACHINE TOOL", which claims priority to Japanese Patent Application Serial No. 2018-105205, filed on May 31, 2018, and titled "VEHICLE", and Japanese Patent Application Serial No. 2018-180738, filed on Sep. 26, 2018 and titled "SYSTEM AND CONTROL METHOD," which are incorporated herein by reference in their entireties.

FIELD OF THE INVENTION

The following description relates to a machine tool.

BACKGROUND OF THE INVENTION

In typical machine tools, a bed is generally supported on an installation surface such as a floor surface at four positions corresponding to the four corners of the bed. This support is generally referred to as four-point support. In such a four-point support, it is difficult to perform height adjustment at the four points such that the bed is supported on the installation surface with a uniform force at every point.

To cope with this problem, Japanese Laid-Open Patent Publication No. 2005-131768 discloses a machine tool in which the bed is supported on an installation surface such as a floor surface at three points. In this machine tool, support points on the installation surface are provided at three positions of the lower surface of the bed, which has a simple quadrilateral box shape.

Japanese Laid-Open Patent Publication No. 10-138132 discloses a typical grinding machine in which a work table is supported on the bed such that the work table is movable back and forth in a sideward direction and a column is supported on the bed such that the column is movable back and forth in a front-rear direction in the same manner. A tool shaft including a tool is supported by the column such that the tool shaft is movable up and down. Such a grinding machine is generally referred to as columnar type.

Conventionally, in some grinding machines, a saddle that moves back and forth in the front-rear direction is supported on the bed, and a work table is supported on the saddle such that the work table is movable back and forth in the sideward direction. Further, a column is arranged at a fixed position, and a tool shaft including a tool is supported on the column such that the tool shaft is movable back and forth. Such a grinding machine is generally referred to as a saddle type.

In the machine tool of Japanese Laid-Open Patent Publication No. 2005-131768, while three-point support is employed, the bed has a simple quadrilateral box shape. In order to ensure sufficient strength and stability, the bed needs to be formed through casting. Thus, it is difficult to prevent the bed from becoming heavy. In addition, the rigidity of the entire bed decreases. Decreases in the rigidity result in decreases in the accuracy of machining a workpiece. Further, the quadrilateral box-shaped bed tends to be unstable when supported at three points. Additionally, the bed has a high volume and weight. This reduces the natural frequency and thus reduces the resonant frequency, which adversely affects the machining accuracy. When the resonant frequency of the bed decreases, the amplitude of vibration increases. As a result, the machining accuracy decreases.

In the column-type grinding machine of Japanese Laid-Open Patent Publication No. 10-138132, when the column accelerates or decelerates in the front-rear direction, the column tends to be inclined in the front-rear direction due to the inertial force of the column. Further, in the column-type grinding machine, the column has a vertically long shape in which the column is relatively long in the vertical direction. This reduces the thickness of the bed located below the column. That is, since the vertically-long, heavy column moves in the front-rear direction on the thin bed, the bed easily deforms due to the weight of the column. Thus, it is difficult to limit decreases in the position accuracy of the column in the vertical direction. As a result, machining with high accuracy is difficult.

In the saddle-type grinding machine, the table is mounted on the saddle that moves back and forth. Thus, the total weight of the saddle and the table may be excessive. While the saddle needs to be reduced in size in order to decrease the weight, the table needs to have a certain length in the sideward direction for machining a workpiece. Thus, the opposite ends of the table protrude from the saddle and are overhung. Accordingly, when the table that moves in the sideward direction particularly reaches the right or left movable end, the overhung part droops greatly. As a result, machining with high accuracy is difficult.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

It is an objective of the following description to provide a machine tool in which the accuracy of machining a workpiece is improved.

According to one general aspect, a machine tool includes a bed including a bottom surface and legs arranged at three positions of the bottom surface. The bed includes two oblique sides arranged such that the bottom surface has a triangular shape.

According to another general aspect, a machine tool includes a bed, a first support surface arranged on the bed, the first support surface extending along a substantially horizontal first axis, a work table supported by the first support surface such that the work table moves back and forth along the first axis, a second support surface arranged on the bed, the second support surface extending along a substantially horizontal second axis, which is perpendicular to the first axis, a machining unit supported by the second support surface such that the machining unit moves back and forth along the second axis, a third support surface arranged at the machining unit, the third support surface extending along a substantially vertical third axis, and a machining shaft unit supported by the third support surface such that the machining shaft unit moves in a vertical direction along the third axis, the machining shaft unit including a tool for machining a workpiece on the work table. The second support surface is located at a position higher than the first support surface.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

A first embodiment of the present disclosure will now be described with reference to the drawings.

Figure 1:
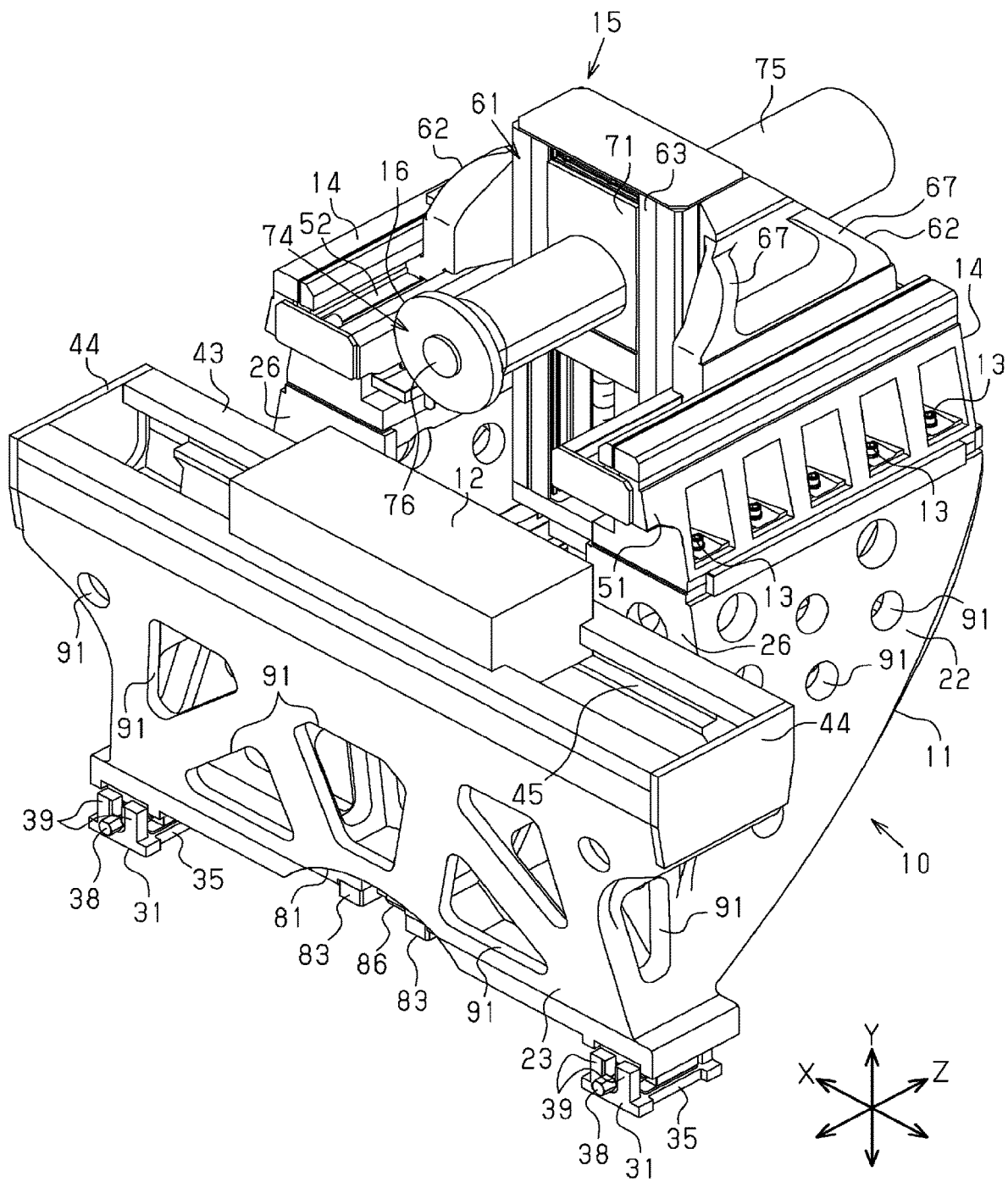
FIG. 1 is a perspective view of a machine tool according to a first embodiment as viewed from above.
Figure 2:
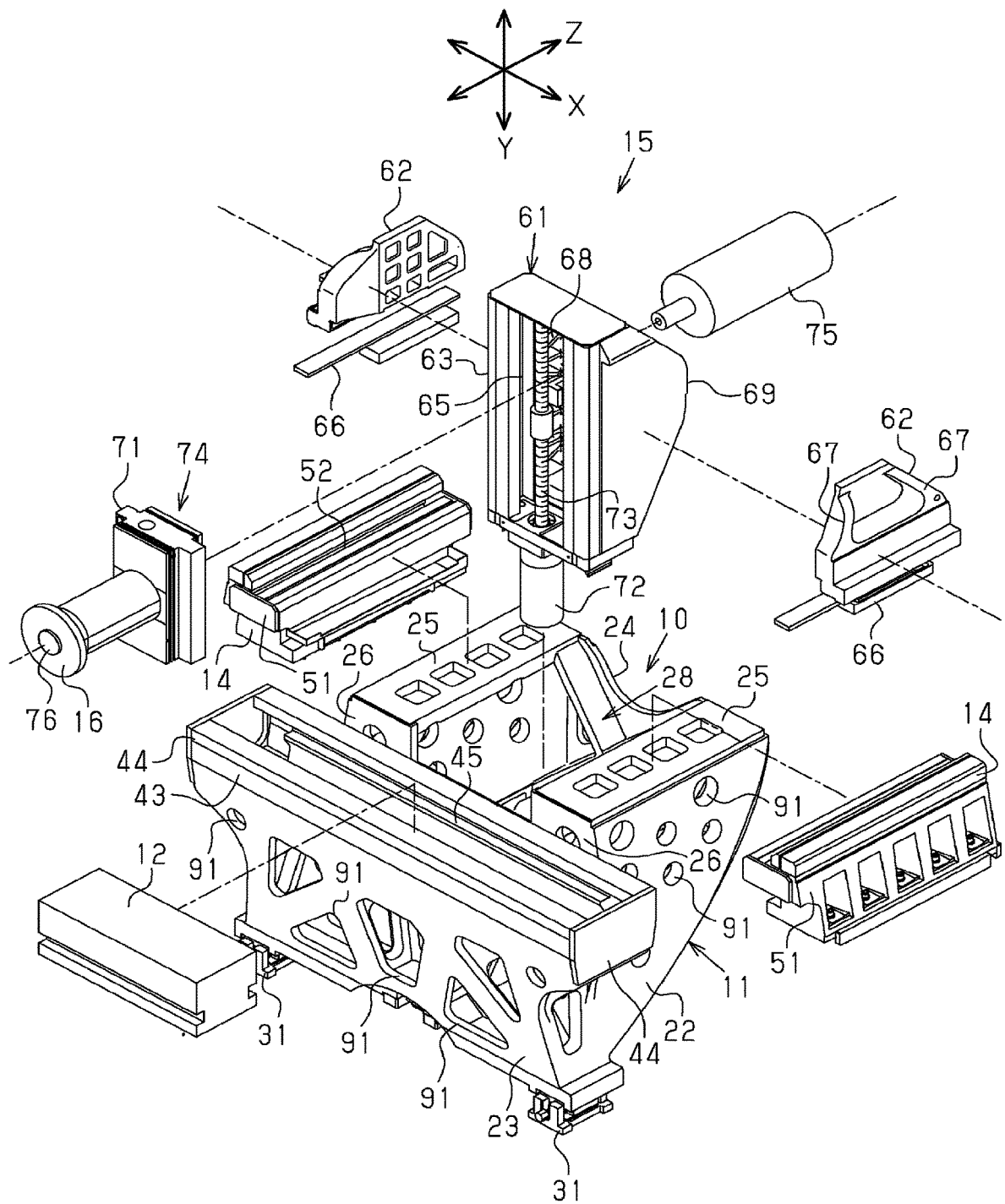
FIG. 2 is an exploded perspective view of the machine tool shown in FIG. 1.

As shown in FIGS. 1 and 2, a machine tool according to a first embodiment includes a bed 10 and a table 12. The bed 10 includes a bed body 11. The table 12 is supported to be movable along a horizontal X-axis at the front part of the bed body 11. The X-axis, which is a first axis, extends in the sideward direction of the machine tool. Further, the machine tool includes two support members 14 and a machining unit 15. The two support members 14 are respectively fixed to the opposite sides of the upper surface of the bed body 11. The machining unit 15 is supported to be movable along a horizontal Z-axis on the two support members 14. The Z-axis, which is a second axis, extends in the front-rear direction of the machine tool and is perpendicular to the X-axis. The support members 14 configure part of the bed 10. The machining unit 15 includes a rotation grindstone 16 movable along a Y-axis. The Y-axis, which is a third axis, extends in the vertical direction of the machine tool and is perpendicular to the X-axis and Z-axis. In a state in which a workpiece is supported on the table 12, the table 12 moves along the X-axis and the rotation grindstone 16 moves along the Z-axis and the Y-axis. With such movements, the rotation grindstone 16 rotates about an axis parallel to the Z-axis is used to perform a predetermined machining on the workpiece.

The structure of each component of the machine tool will now be described in detail.

First, the bed body 11 and the components related to the bed body 11 will be described.

Figure 3:
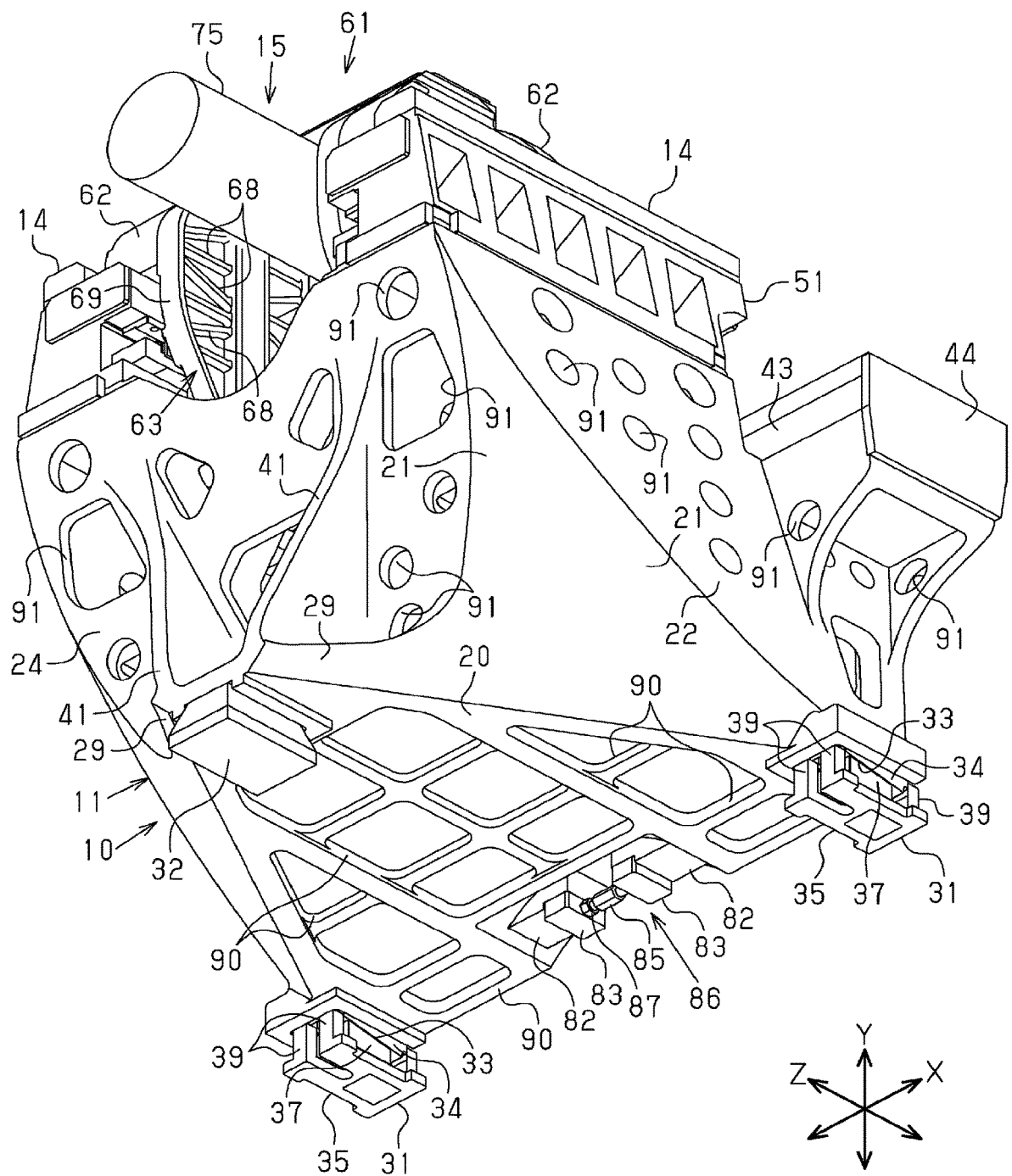
FIG. 3 is a perspective view of the machine tool of FIG. 1 as viewed from below.
Figure 7:
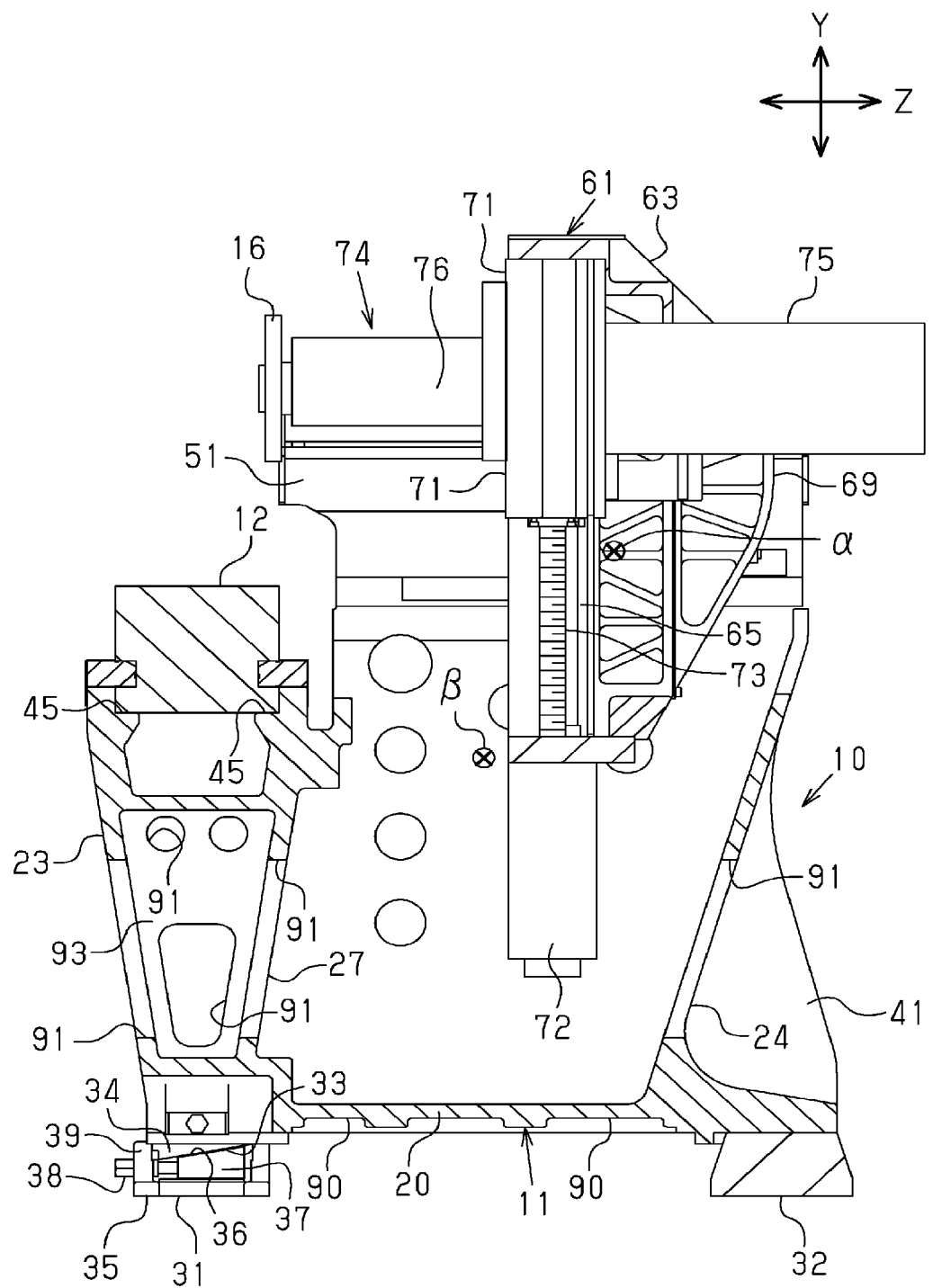
FIG. 7 is a cross-sectional view taken along line 7-7 in FIG. 4.

Referring to FIGS. 1 to 3, the bed body 11 is an integrated body entirely formed through casting and includes a substantially triangular bottom plate 20, two side plates, a front plate 23, and a rear plate 24. Each of the two side plates includes a substantially triangular lower side plate 21 and a substantially triangular upper side plate 22. The lower side plate 21 is one example of an oblique side. The upper edges of the two side plates, that is, the upper edges of the two upper side plates 22, extend along the Z-axis in parallel to each other. The upper ends of the two upper side plates 22 are provided with horizontal upper plates 25, and the front surfaces of the two upper side plates 22 are provided with upright plates 26. As shown in FIG. 7, an inner plate 27 is arranged rearward from the front plate 23. As shown in FIG. 2, the bed body 11 includes an open portion 28 that opens upward between the two upper plates 25.

As shown in FIG. 3, the bottom plate 20 is triangular because of the arrangement of the lower side plates 21, which are the oblique sides. That is, the lower side plates 21 are configured and arranged such that the bottom plate 20 has a triangular shape. In other words, the lower side plates 21 are arranged to define the bottom plate 20 in a triangular shape. The lower edges of the two side plates, that is, the lower edges of the two lower side plates 21, configure two of the three outer edges (sides) of the triangular bottom plate 20. Thus, the bottom plate 20 includes two triangular tops located at the front part of the bottom plate 20 and the remaining one triangular top located at the rear part of the bottom plate 20. The three tops are provided with legs. That is, the two front tops are provided with front legs 31, and the rear top is provided with a rear leg 32. The two front legs 31 are located on a line parallel to the X-axis, and the rear leg 32 is located on a line that extends through the center of the two front legs 31 and is parallel to the Z-axis.

Figure 6:
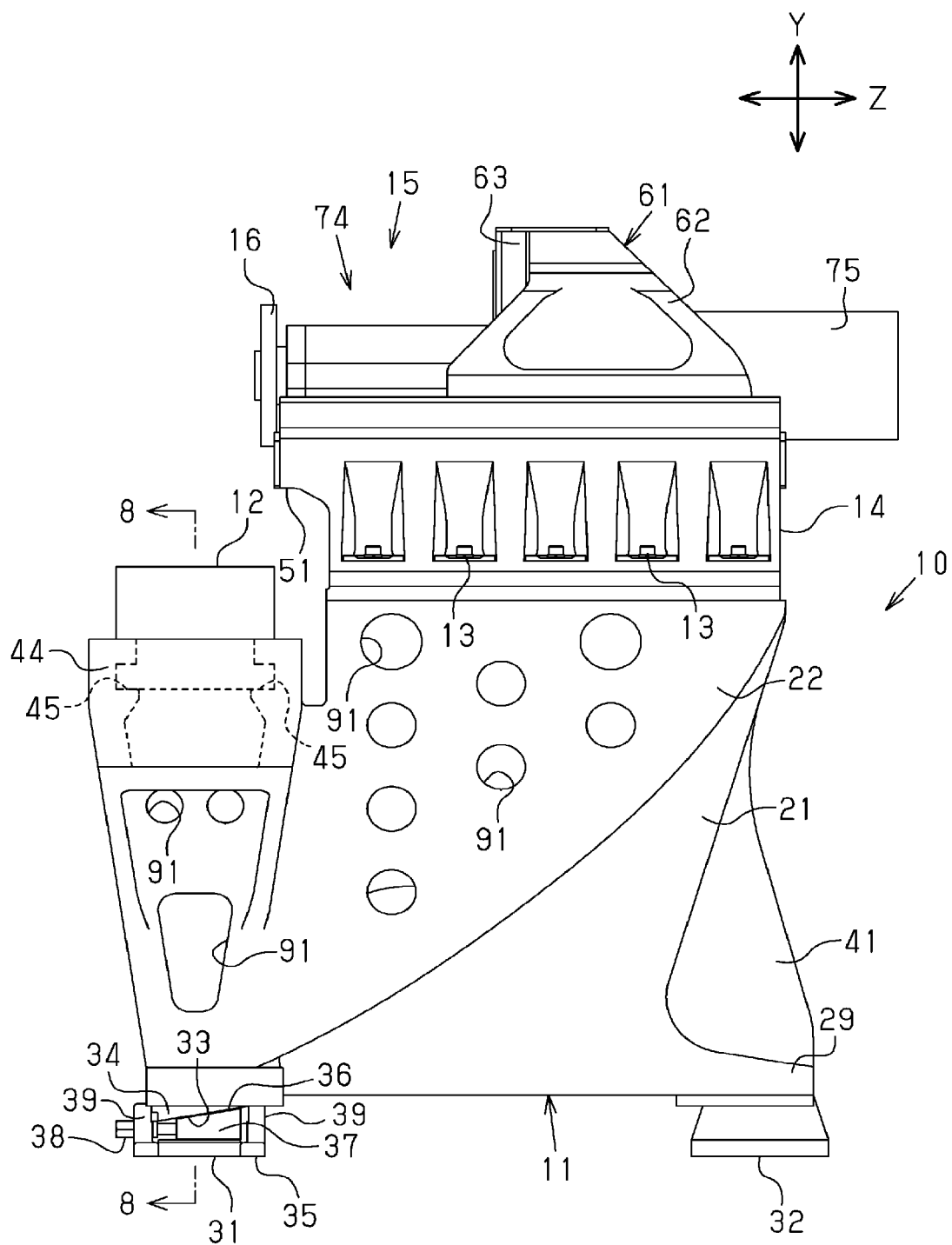
FIG. 6 is a side view of the machine tool shown in FIG. 1.

As shown in FIGS. 6 and 7, each front leg 31 includes a fixed cam body 34 that has an inclined surface 33 and a leg member 35 that is movable up and down. The upper surface of the leg member 35 is provided with a movable cam body 37 having an inclined surface 36 that is in contact with the inclined surface 33. The leg member 35 is prevented from being separated from the fixed cam body 34 and the bed body 11 by restriction portions 39 arranged at the front and rear of the leg member 35. The leg member 35 is arranged on an installation surface such as a floor surface. Screw action based on rotation of an adjustment screw 38 causes the inclined surface 33 of the movable cam body 37 to slide on the inclined surface 36 of the fixed cam body 34. This moves the leg member 35 up and down. As a result, the height of the front leg 31 is adjusted. The height of the rear leg 32 is fixed.

As shown in FIGS. 3, 6, and 7, the rear plate 24 is inclined such that the lower part is located frontward from the upper part. A rear end corner of the bottom plate 20 is located rearward from the rear plate 24, and the rear leg 32 is located at the rear end corner. Two reinforcement ribs 41, which are reinforcement portions, are provided between the rear end corner of the bottom plate 20 and the outer surface of the rear plate 24. The two reinforcement ribs 41 have a triangular shape. Further, the two reinforcement ribs 41 are inclined and extended such that the reinforcement ribs 41 are located closer to each other toward the lower side. The reinforcement ribs 41 are integrated with the rear end corner of the bottom plate 20 and the rear plate 24. Rear ends 29 of the two lower side plates 21 extend to the lower ends of the reinforcement ribs 41.

As shown in FIGS. 1, 2, and 6, a gutter-shaped table traveling portion 43 extending along the X-axis is arranged between the front ends of the two upper side plates 22 at the front of the upright plates 26. The table traveling portion 43 opens upward and has opposite ends that open in the longitudinal direction. The two front legs 31 are located immediately below the opposite ends of the table traveling portion 43, more specifically, located immediately below the center of the opposite ends in the width direction. The opposite ends of the table traveling portion 43 are closed by end members 44. First guide rails 45 are fixed to the table traveling portion 43 between the two end members 44 such that the first guide rails 45 are arranged back and forth. The first guide rails 45 are first support surfaces. The table 12 is supported by the first guide rails 45 to be slidable along the X-axis. The table 12 is moved along the X-axis by, for example, a linear motor (not shown).

As shown in FIGS. 1, 2, 4, and 5, the two support members 14 are respectively fixed on the upper surfaces of the two upper plates 25 by bolts 13 such that the support members 14 are located on the opposite sides of the open portion 28. The upper parts of the front ends of the two support members 14 are provided with overhung parts 51 that protrude frontward. A second guide rail 52 extending along the Z-axis is coupled to the upper surface of each support member 14. The second guide rail 52, which is a second support surface, extends over the entire length of the support member 14 including the overhung part 51 in the direction in which the Z-axis extends.

As shown in FIGS. 1 and 2, a unit frame 61, which is a support body, arranged between the second guide rails 52 and in the open portion 28. The unit frame 61 is movable along the Z-axis. The unit frame 61 includes two sliders 62, which are side members, and quadrilateral support frame 63. The two sliders 62 are respectively supported by the two second guide rails 52. The support frame 63 is arranged between the two sliders 62 and fixed to the two slides 62. Third guide rails 65 extending along the Y-axis are coupled to the inner surface of the support frame 63. The third guide rails 65 are third support surfaces. When linear motors 66 arranged on the opposite sides of the support frame 63 are driven, the support frame 63 and the sliders 62 move back and forth along the second guide rails 52 in the open portion 28. A curved portion, that is, a side bulged portion 67 bulged outward in an arcuate manner, is integrated with the outer surface of each slider 62. Reinforcement ribs 68 are integrated with the inner surface of the support frame 63. Curved portions, that is, rear bulged portions 69 bulged in an arcuate manner, are integrated with the rear surface of each support frame 63.

As shown in FIGS. 1, 2, and 7, a lift frame 71 is supported by the third guide rails 65 to be movable up and down in the support frame 63. A motor 72 is coupled to the lower end of the support frame 63. In the support frame 63, a ball screw 73 is supported to extend along the Y-axis. The ball screw 73 rotates when the motor 72 is driven. The lift frame 71 moves up and down as the ball screw 73 rotates forward and backward. A grindstone shaft unit 74, which is a machining shaft unit, is supported by the lift frame 71. A grindstone shaft 76 that is rotated by a motor 75 is supported by the grindstone shaft unit 74. The rotation grindstone 16, which is located frontward from the overhung parts 51, is supported by the front end of the grindstone shaft 76.

In the present embodiment, the machining unit 15 is configured by, for example, the unit frame 61, the lift frame 71, and the grindstone shaft unit 74. As shown in FIG. 7, in a state in which the machining unit 15 is supported by the second guide rails 52, the center of gravity α of the machining unit 15 is located in the inner space of the bed body 11. The center of gravity α of the machining unit 15 is located at a position lower than the second guide rails 52. Further, the center of gravity β of the machine tool is located at a position lower than the center of gravity α of the machining unit 15.

Figure 4:
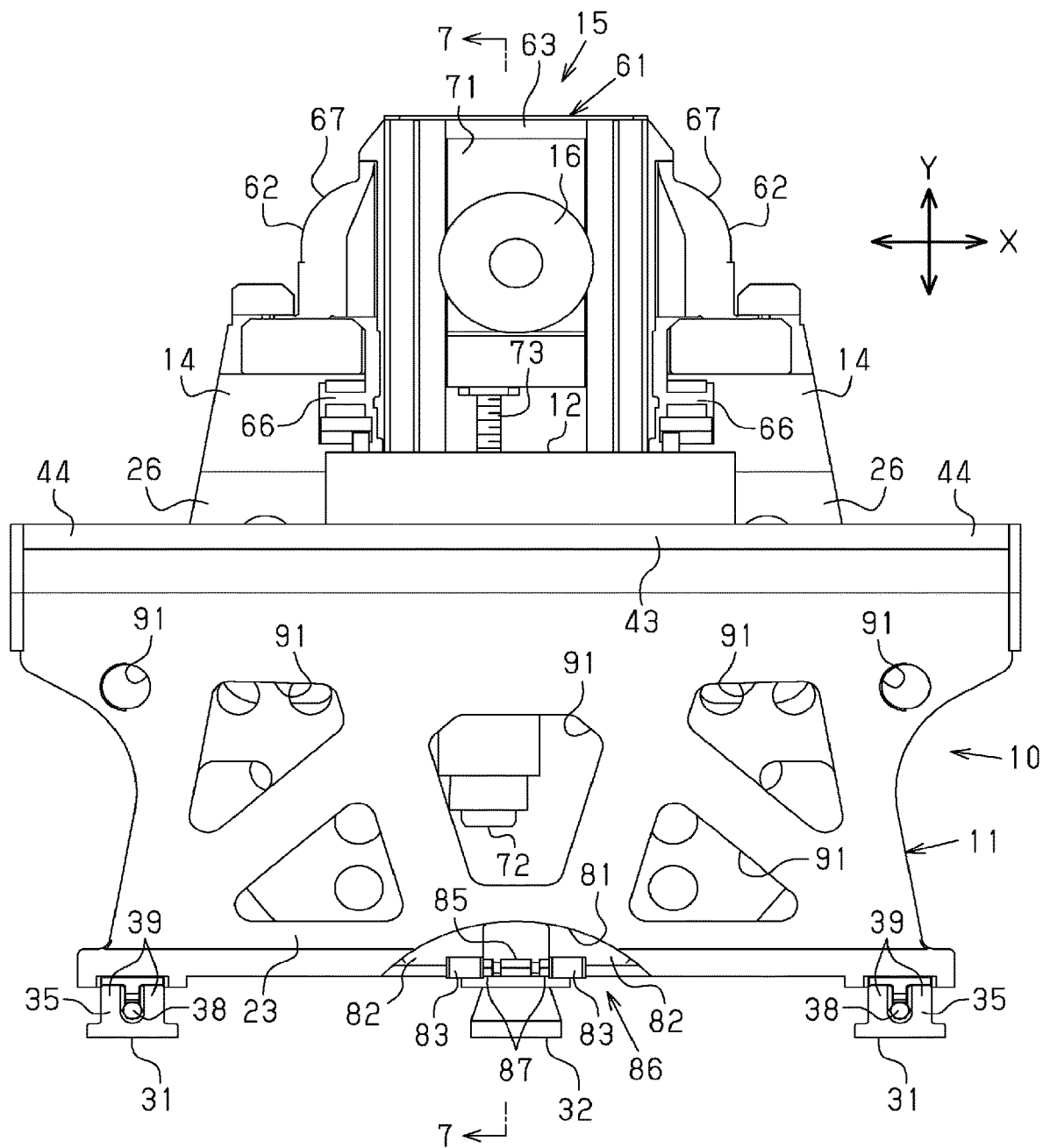
FIG. 4 is a front view of the machine tool shown in FIG. 1.
Figure 5:
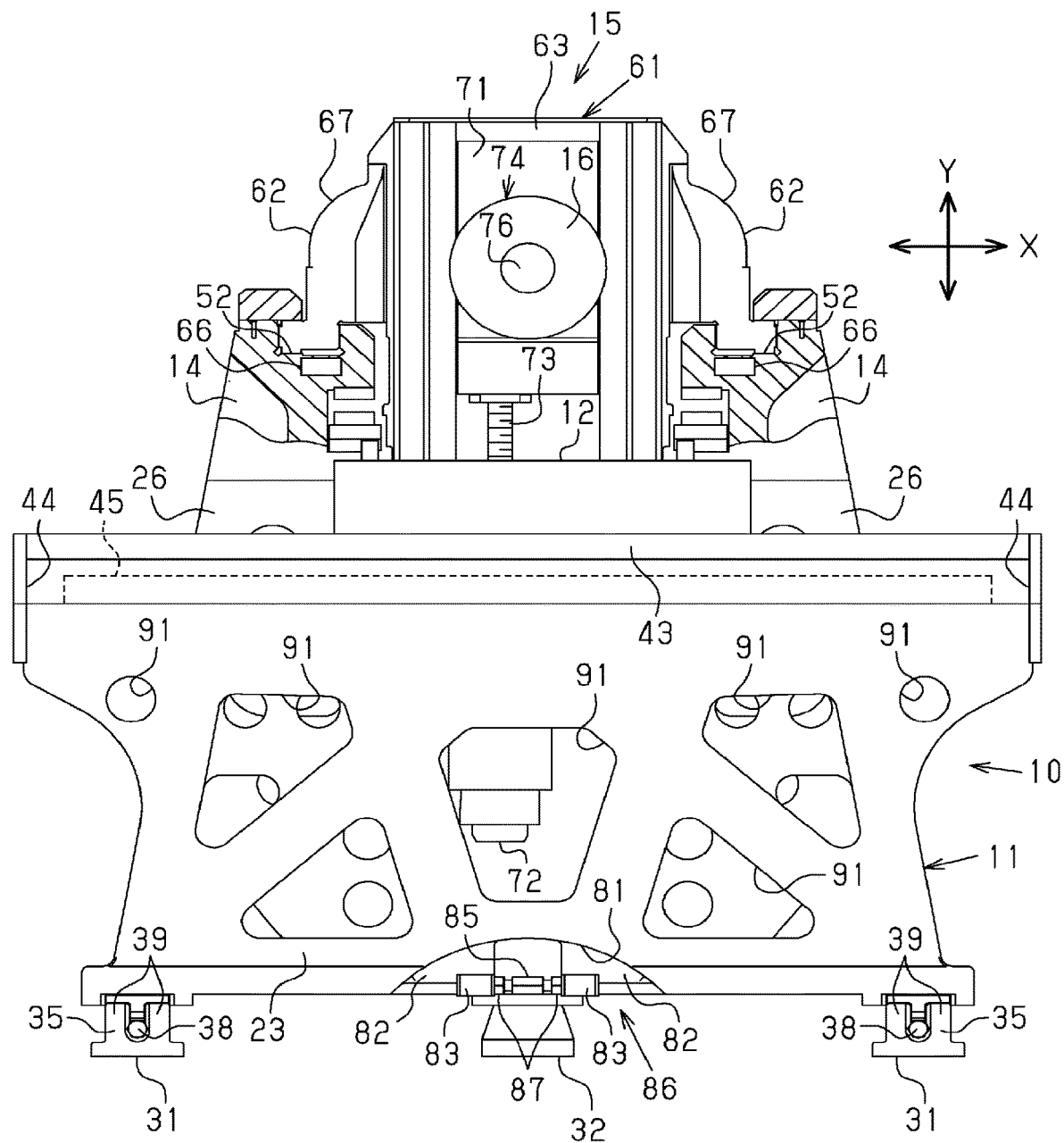
FIG. 5 is a partially broken front view of the machine tool shown in FIG. 4.
Figure 8:
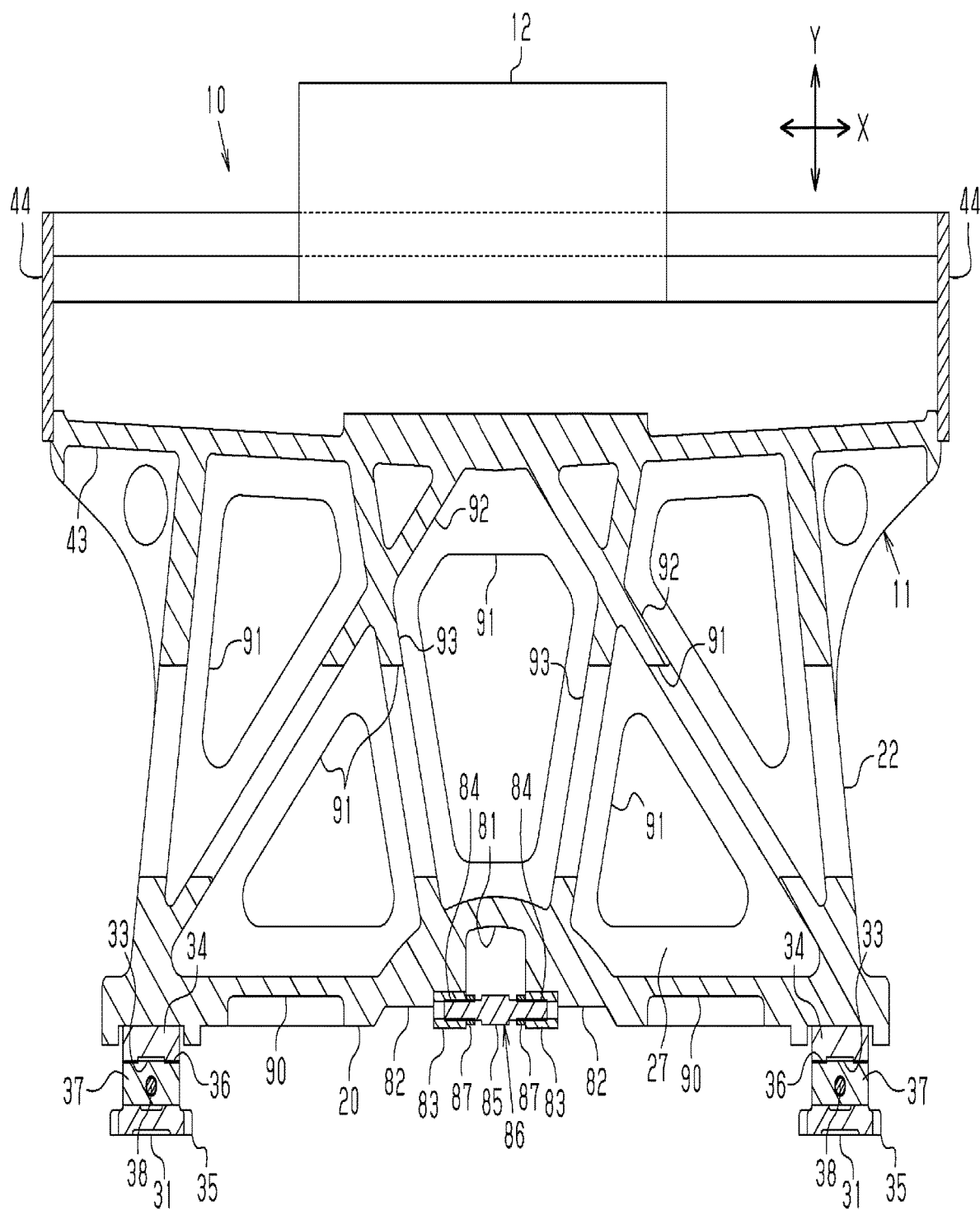
FIG. 8 is a cross-sectional view taken along line 8-8 in FIG. 6.

As shown in FIGS. 3, 4, and 8, the lower surface of the bed body 11 has an arcuate recess 81. The recess 81 is located immediately below the center of the table traveling portion 43 in the longitudinal direction and the width direction. In the recess 81, two projections 82 are spaced apart from each other. Receiving members 83 are respectively fixed to the lower surfaces of the two projections 82. The receiving members 83 respectively include internal threads 84 in which the spirals are wound in different directions. Threaded parts of the opposite ends of an external thread member 85 are coupled to the two internal threads 84. The receiving members 83, which are first thread bodies, and the external thread member 85, which is a second thread body, configure an adjustment member 86 having the form of a turnbuckle. A locknut 87 that resists loosening is coupled to each threaded part of the external thread member 85. The locknut 87 is configured by, for example, a double nut. An operation part arranged on the center of the external thread member 85 is operated to rotate the external thread member 85. This causes the two receiving members 83 to receive force that moves the receiving members 83 toward or away from each other. As a result, the bed body 11 is deformed to adjust the straightness of the first guide rail 45.

The two upper side plates 22, the front plate 23, the rear plate 24, the inner plate 27, and the table traveling portion 43 have through-holes 91, which are thinned portions. The through-holes 91 have various shapes such as quadrilateral, circle, triangle, trapezoid, and deformed quadrilateral. The lower surface of the bottom plate 20 has recesses 90.

As shown in FIGS. 7 and 8, two plate-shaped first reinforcement frames 92 and two plate-shaped second reinforcement frames 93 are arranged between the front plate 23 and the inner plate 27. The first reinforcement frames 92 and the second reinforcement frames 93, which are reinforcement portions, are integrated with the front plate 23 and the inner plate 27. As shown in FIG. 8, as viewed in the direction in which the Z-axis extends, the first reinforcement frames 92 and the second reinforcement frames 93 are symmetrical. The first reinforcement frames 92 and the second reinforcement frames 93 cross each other to be integrated with each other. Quadrilateral through-holes 91, which are thinned portions, extend through the middle parts of the first reinforcement frames 92 and the second reinforcement frames 93 in the vertical direction. The first reinforcement frames 92 extend from the center of the lower surface of the table traveling portion 43 to the intersection parts of the upper side plate 22 and the bottom plate 20. Thus, the front legs 31 and the surroundings of the front legs 31 are reinforced by the intersection points. The second reinforcement frames 93 extend from the center of the lower surface of the table traveling portion 43 to the part of the bottom plate 20 where the recess 81 is located. The front plate 23 and the inner plate 27 have through-holes 91 at positions located away from the first reinforcement frames 92 and the second reinforcement frames 93.

The operation of the machine tool will now be described.

In the machine tool of the present embodiment, a workpiece is supported on the table 12. In a state in which the rotation grindstone 16 is rotating, the lift frame 71 and the rotation grindstone 16 are moved along the third guide rails 65 in the direction in which the Y-axis extends. This adjusts the height of the rotation grindstone 16. Further, the table 12 is moved back and forth along the first guide rails 45 in the direction in which the X-axis extends, and the grindstone shaft unit 74 and the rotation grindstone 16 are moved along the second guide rails 52 in the direction in which the Z-axis extends. In this manner, the rotation grindstone 16 is used to grind the workpiece.

The machine tool of the present embodiment has the following advantages.

(1) The machine tool includes two front legs 31 and one rear leg 32 at three positions of the bottom surface of the bottom plate 20 of the bed 10. Thus, the machine tool is supported at three points on an installation surface such as the floor surface of a factory. That is, the machine tool can be supported stably regardless of the flatness of the installation surface. As the adjustment screws 38 of the front legs 31 are operated, the inclined surfaces 33 and 36 slide relative to each other. This adjusts the heights of the leg members 35 of the front legs 31. Thus, the horizontality and height of the machine tool are maintained properly. In contrast, in a bed with four-point support, adjusting the heights of the legs is troublesome. Thus, the accuracy of machining a workpiece may be reduced due to insufficient adjustment. Three-point support allows adjustment to be performed relatively easily and thus reduces such inconvenience.

(2) The bottom plate 20 of the bed body 11 has a triangular shape. Thus, as compared to a prior-art machine tool having a quadrilateral bottom plate, the bed body 11 is reduced in size. This reduces the weight of the machine tool. Particularly, in the present embodiment, the bottom plate 20 is substantially triangular, and the lower side plate 21 and the upper side plate 22 are triangular. Further, the rear plate 24 is inclined such that the lower part is located frontward from the upper part. This reduces the volume of the bed body 11 and thus further reduces the size and weight of the bed body 11. Such reduction of the bed body 11 in size improves the rigidity of the entire bed body 11 and increases the accuracy of machining a workpiece. Additionally, the bed body 11 includes the recesses 90 and the through-holes 91 at multiple positions of the bed body 11 while satisfying the required strength. This reduces limits on installation places of the machine tool and facilitates movement and conveyance of the machine tool.

(3) The reduction of the bed body 11 in size, the reduction of the volume of the bed body 11, and the formation of the recesses 90 and the through-holes 91 allow the bed body 11 to be formed with fewer components and reduced in weight. This increases the natural frequency of the bed body 11. When the vibration energy is the same, the amplitude of the resonant frequency decreases as the resonant frequency of the bed body 11 increases. Thus, the machining accuracy is improved.

(4) The parts of the bed body 11 other than the table traveling portion 43 have a smaller width than the table traveling portion 43 (dimension along the X-axis). Further, the bed body 11 includes the lower side plates 21, which are triangular, and thus gradually decreases in width toward the rear. Thus, as described above, the bed body 11 can be reduced in size and weight. This allows for machining with high accuracy. Additionally, space exists below each of the lower side plates 21 of the bed body 11. This space can be employed to install hydraulic pipes and wires.

(5) The front legs 31 are arranged at the positions corresponding to the opposite ends of the table traveling portion 43. Thus, even if the part of the bed body 11 located rearward from the table traveling portion 43 has a smaller width than the table traveling portion 43, the table traveling portion 43 is prevented from being deformed. This allows for machining with high accuracy.

(6) The first and second reinforcement frames 92 and 93, which are integrated with the table traveling portion 43 and are inclined to extend such that the first and second reinforcement frames 92 and 93 cross each other, are arranged below the table traveling portion 43. This prevents the table traveling portion 43 from deforming and thus allows for machining with high accuracy. Further, the first and second reinforcement frames 92 and 93 are inclined to extend, and the lower ends of the first reinforcement frames 92 are integrated with the upper side plates 22, where the front legs 31 are located. In addition, the two second reinforcement frames 93 converge at the lower center of the bed body 11 to be integrated with each other. Thus, machining pressure acting on the table traveling portion 43 is applied to the first and second reinforcement frames 92 and 93 in a direction in which the first and second reinforcement frames 92 and 93 are compressed. This effectively prevents deformation of the table traveling portion 43.

(7) The rear leg 32 is located rearward from the table traveling portion 43 on a line that extends through the center of the table traveling portion 43 in the longitudinal direction and is parallel to the Z-axis. Thus, since the rear leg 32 is located immediately below the movable range of the unit frame 61, which includes the grindstone shaft unit 74, the unit frame 61 moves stably. This contributes to the high-accuracy machining of a workpiece.

(8) The sliders 62 of the unit frame 61, which are supported by the second guide rails 52, are provided with the side bulged portions 67, which bulge in the horizontal direction. This improves the rigidity for supporting the unit frame 61 and contributes to the high-accuracy machining of a workpiece.

(9) The reinforcement ribs 68 are formed on the inner side of the support frame 63 of the unit frame 61. Further, the rear bulged portions 69, which bulge rearward, are arranged at the rear part of the support frame 63. This improves the rigidity for supporting the unit frame 61 and contributes to the high-accuracy machining of a workpiece.

(10) The unit frame 61 is supported by the second guide rails 52 via the sliders 62, which are located on the opposite sides of the unit frame 61. Further, the machining unit 15 is located in the inner space of the bed body 11 through the open portion 28 of the bed body 11. This allows the machining unit 15, which is the uppermost part of the machining unit 15, to be located at a lower position and thus lowers the height of the entire machining unit 15. Further, the motor 72, which drives the ball screw 73 of the machining unit 15, is located at the lower part of the machining unit 15. This also allows the center of gravity α of the machining unit 15 to be located below the second guide rail 52. In this manner, the center of gravity α can be located at a low position in the bed body 11. This lowers the height of the machining unit. Thus, the machining unit 15 can be supported stably. Further, vibration of the machining unit 15 is limited to improve the accuracy of machining a workpiece.

(11) Since the center of gravity β of the machine tool is located at a position lower than the center of gravity α of the machining unit 15, the machining unit 15 can be installed stably. This reduces vibration of the machine tool and improves the accuracy of machining a workpiece.

(12) The front ends of the two support members 14 are provided with the overhung parts 51, which protrude frontward. Thus, even if the grindstone shaft unit 74 is moved forward to machine a workpiece, the grindstone shaft 76 is rarely cantilevered. Accordingly, even if the grindstone shaft 76 is moved forward to a large extent, decreases in the accuracy of machining a workpiece are limited.

(13) The front plate 23 of the bed body 11 is inclined such that the lower part is located rearward from the upper part. This limits interference of the front plate 23 with the lower limbs of a worker such as a toe located on the front side of the bed body 11. Thus, the worker can perform operations easily.

(14) The framework of the machine tool is configured as an assembled unit including multiple members such as the bed body 11, the support members 14, the support frame 63, the sliders 62, and the unit frame 61. Further, the movement accuracy of the members that move along the X-axis, the Y-axis, and the Z-axis can be easily adjusted by adjusting the positional relationship of the members that configure the framework of the machine tool.

(15) The reinforcement ribs 41 are arranged above the rear leg 32. Thus, even if the rear plate 24 is inclined, the strength and rigidity of the portion where the rear leg 32 is located are ensured.

(16) The adjustment member 86, which has the form of a turnbuckle, is located at the lower center of the front end of the bed body 11. The curvedness of the bed body 11 (especially, the lower front part of the bed body 11) can be adjusted by loosening the locknuts 87 and rotating the adjustment member 86. Thus, the adjustment member 86 facilitates fine adjustment of the degree of deformation and the inclination angle relative to the horizontal surface of the table traveling portion 43. This improves the movement accuracy of the table 12 and consequently improves the accuracy of machining a workpiece.

(17) The through-holes 91 are formed at multiple positions of the bed body 11. Thus, air flows smoothly between the inside and outside of the machine tool through the through-holes 91. This limits differences in the temperature of the inside and outside of the machine tool, limits the deformation of the machine tool resulting from the temperature, and improves the accuracy of machining a workpiece. Additionally, the inner part of the machine tool can be checked, inspected, and cleaned through the through-holes 91. This improves the maintainability of the machine tool.

(18) The second guide rails 52, which are the second support surfaces that guide movement of the machining unit 15 including the grindstone shaft unit 74 and the support frame 63 along the Z-axis of the machining unit 15, are located at a position higher than the first guide rails 45, which are the first support surfaces. This increases the dimension (height or thickness) of the portion of the bed 10 in the vertical direction located below the second guide rails 52. Accordingly, the rigidity of the portion that supports the second guide rail 52 is improved to limit the deformation of the bed 10 resulting from load on the machining unit 15. This improves the movement accuracy of the machining unit 15 and the machining accuracy.

(19) As described above, the second guide rails 52 are located at a position higher than the first guide rails 45. This eliminates the need to arrange a tall, heavy column that supports the grindstone shaft unit 74. This avoids inconveniences such as inclination of the column that results from acceleration and deceleration of the column. This allows the machining unit 15 to be accurately moved straight along the second guide rails 52, ensures the position accuracy of the grindstone shaft unit 74, and allows for high-accuracy machining as described above.

Second Embodiment

A second embodiment of the present disclosure will now be described, mainly focusing on the differences from the first embodiment.

Figure 9:
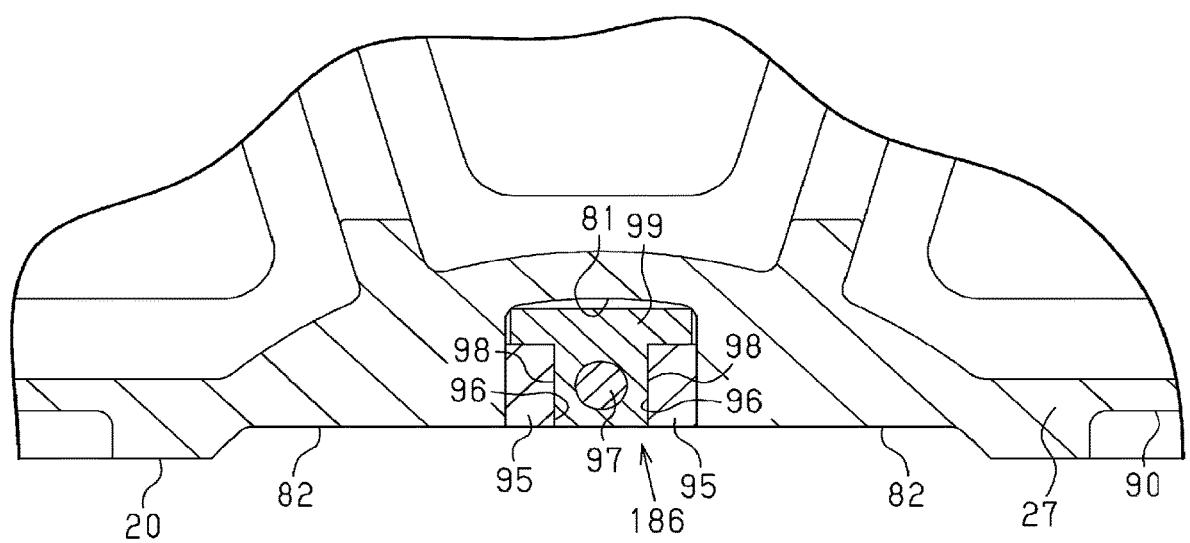
FIG. 9 is a partial cross-sectional view of a machine tool according to a second embodiment.
Figure 10:
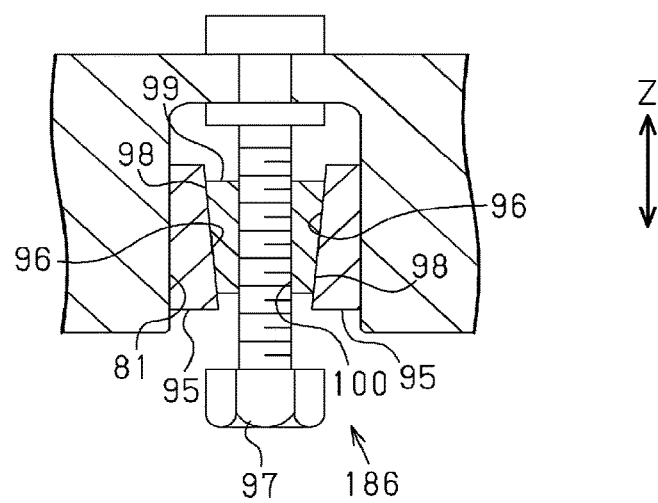
FIG. 10 is a partial cross-sectional view of the machine tool shown in FIG. 9.

As shown in FIGS. 9 and 10, in the second embodiment, the adjustment member 86 of the first embodiment, which has the form of a turnbuckle, is replaced with an adjustment member 186 as described below. That is, the recess 81 located at the lower center of the bed body 11 has two inner surfaces opposed to each other, and fixed wedge members 95 including inclined surfaces 96 are respectively fixed to the inner surfaces. An adjustment screw 97 is supported by the bed body 11 such that the adjustment screw 97 cannot move in the axial direction and cannot rotate. An internal thread 100 of a movable wedge member 99 is coupled with the adjustment screw 97. The opposite side surfaces of the movable wedge member 99 have inclined surfaces 98. The inclined surfaces 98 are respectively in close contact with the inclined surfaces 96 of the fixed wedge members 95.

When the adjustment screw 97 is rotated, the movable wedge member 99 moves along the Z-axis in a first direction or in a second direction, which is opposite to the first direction. As the movable wedge member 99 moves, the two fixed wedge members 95 move toward or away from each other. This adjusts the flexing amount of the bed body 11 and adjusts the straightness of the first guide rails 45.

Modifications

The first and second embodiments may be modified as described below.

The locations of the adjustment members 86 and 186 may be changed to, for example, the rear part of the bed body 11.

The number of the adjustment members 86 and 186 may be changed. For example, the adjustment members 86 and 186 may be arranged at the lower rear part of the bed body 11 and/or the opposite sides of the rear part of the bed body 11 in addition to the center of the lower front part of the bed body 11. Alternatively, the adjustment members 86 and 186 may be arranged at the middle and/or upper part of the bed body 11 in the vertical direction in addition to the lower part of the bed body 11.

The tool is not limited to a rotation grindstone and may be, for example, a drill, a milling cutter, an endmill, or a hob.

The recesses 90 or the through-holes 91, which are the thinned portions, may be omitted.

The lower side plates 21, which are the oblique sides, may be omitted. The upper side plate 22 may be inclined in the same manner as the lower side plates 21 such that at least part of the upper side plate 22 configures the oblique sides.

The bed body 11 and the support members 14 may be formed as an integrated body.

The adjustment member that adjusts the deformation amount of the bed body 11 may include two external thread bodies (first thread bodies) fixed to the bed body 11 and arranged coaxially to be opposed to each other and an internal thread body (second thread body) arranged between the two external thread bodies and coupled to the two external thread bodies. The internal thread body includes an operation part and threaded parts that respectively extend from the opposite ends of the operation part. When the internal thread body is rotated, the two external thread bodies move toward or away from each other, thereby adjusting the deformation amount of the bed body 11.

The technical ideas understood from the above-described embodiments and the modifications are as follows.

(A) A machine tool comprising:
a bed;
a table traveling portion arranged at an upper front part of the bed;
a work table configured to travel along the table traveling portion; and
legs arranged at three positions of a bottom surface of the bed, wherein
the legs include two front legs arranged at positions corresponding to opposite ends of the table traveling portion in a longitudinal direction, and
the table traveling portion has a length larger than a width of a part of the bed located rearward from the table traveling portion.

(B) The machine tool according to item (A), wherein the legs includes a rear leg arranged rearward from a center of the table traveling portion in the longitudinal direction.

(C) A machine tool comprising:
a bed; and
an adjustment member configured to adjust a deformation degree of the bed, the adjustment member being arranged at the bed,
wherein the adjustment member includes
two first thread bodies fixed to the bed, the two first thread bodies being arranged coaxially to be opposed to each other, and
a second thread body including an operation part and two threaded parts respectively arranged at opposite ends of the operation part and coupled to the first thread bodies.

The adjustment member of the machine tool according to item (C) is also applicable to a machine tool other than the above-described embodiments, for example, a machine tool including four legs and supported at four points on an installation surface.

(D) A machine tool comprising:
a bed; and
an adjustment member configured to adjust a deformation degree of the bed, the adjustment member being arranged at the bed,
wherein the adjustment member includes
two fixed wedge members fixed to the bed and opposed to each other, and
a movable wedge member arranged between the fixed wedge members and engaged with the fixed wedge members.

The adjustment member of the machine tool according to item (D) is also applicable to a machine tool other than the above-described embodiments, for example, a machine tool including four legs and supported at four points on an installation surface.

(E) The machine tool according to item (C) or (D), comprising a table traveling portion arranged at a front part of the bed and extending along a first axis,
wherein the adjustment member is located at a position corresponding to a center of the table traveling portion in a longitudinal direction.

What is claimed is:
1. A machine tool comprising:
a bed;
a guide rail arranged on the bed and extending along a first axis;
a table configured to support a workpiece, the table being supported by the guide rail such that the table moves along the first axis; and
an adjustment member arranged at a lower part of the bed and configured to adjust a deformation degree of the bed, wherein
the bed includes two attachment portions spaced apart from each other in a direction along the first axis,
the adjustment member includes:
two first thread bodies respectively fixed to the two attachment portions and extending along the first axis, the two first thread bodies being arranged coaxially and opposed to each other at an interval in the direction along the first axis; and
a second thread body including an operation part and two threaded parts respectively arranged at opposite ends of the operation part and coupled to the first thread bodies,
the operation part is operated to rotate the second thread body so that the two attachment portions receive, from the two first thread bodies, a force that moves the two attachment portions toward or away from each other, whereby the bed is deformed to adjust the straightness of the guide rail.
2. The machine tool according to claim 1, wherein the adjustment member is located below the guide rail at a position corresponding to a center of the guide rail in the direction along the first axis.

* * * * *